US008927612B2

(12) United States Patent
Zhang et al.

(10) Patent No.: US 8,927,612 B2
(45) Date of Patent: Jan. 6, 2015

(54) COMPOSITE HAVING ION EXCHANGE FUNCTION AND PREPARATION METHOD AND USE THEREOF (75) Inventors: Yongming Zhang, Zibo (CN); Junke Tang, Zibo (CN); Ping Liu, Zibo (CN); Heng Zhang, Zibo (CN); Jun Wang, Zibo (CN)

(73) Assignee: Shandong Huaxia Shenzhou New Material Co., Ltd., Zibo, Shandong (CN)

( * ) Notice: Subject to any disclaimer, the term of this patent is extended or adjusted under 35 U.S.C. 154(b) by 0 days.

(21) Appl. No.: 13/805,325

(22) PCT Filed: Jun. 18, 2010

(86) PCT No.: PCT/CN2010/000891
§ 371 (c)(1),
(2), (4) Date: Dec. 18, 2012

(87) PCT Pub. No.: WO2011/156933
PCT Pub. Date: Dec. 22, 2011

(65) Prior Publication Data
US 2013/0096214 A1    Apr. 18, 2013

(51) Int. Cl.
*H01M 8/10*    (2006.01)
(52) U.S. Cl.
USPC .............................. 521/27; 521/32; 429/492
(58) Field of Classification Search
USPC ..................... 521/27, 32; 429/492
See application file for complete search history.

(56) References Cited

U.S. PATENT DOCUMENTS

| 6,254,978 | B1* | 7/2001 | Bahar et al. ............... 428/305.5 |
| 7,411,022 | B2 | 8/2008 | Guerra et al. |
| 2006/0177717 | A1 | 8/2006 | Teasley et al. |
| 2008/0063917 | A1* | 3/2008 | Yamashita et al. ............ 429/33 |
| 2009/0292105 | A1* | 11/2009 | Michot ..................... 528/391 |
| 2012/0035283 | A9* | 2/2012 | Xu et al. ...................... 521/50.5 |
| 2013/0084460 | A1* | 4/2013 | Xu et al. ...................... 428/422 |
| 2013/0095411 | A1* | 4/2013 | Zhang et al. ................ 429/492 |
| 2013/0203874 | A1* | 8/2013 | Xu et al. ...................... 521/50.5 |

FOREIGN PATENT DOCUMENTS

| CN | 101670246 A | 3/2010 |
| CN | 101733005 A | 6/2010 |
| CN | 101733016 A | 6/2010 |

OTHER PUBLICATIONS

International Search Report completed Mar. 2, 2011 and mailed Mar. 24, 2011, corresponding to PCT/CN2010/000891, 8 pages, including English translation.

* cited by examiner

*Primary Examiner* — Peter D. Mulcahy
*Assistant Examiner* — Henry Hu
(74) *Attorney, Agent, or Firm* — Christie, Parker & Hale, LLP (57) ABSTRACT A composite having ion exchange function, preparation method and use thereof are provided. The composite is formed by compounding ion exchange resin with fluorine-containing polymer porous membrane, wherein the nitrile groups in the ion exchange resin react with the nitrile groups grafted on the fluorine-contained polymer porous membrane to form triazine ring crosslinked structure. The composite has excellent mechanical property and gas impermeability, high ion exchange capacity and high electroconductivity.

12 Claims, 2 Drawing Sheets

COMPOSITE HAVING ION EXCHANGE FUNCTION AND PREPARATION METHOD AND USE THEREOF

CROSS-REFERENCE TO RELATED APPLICATION(S)

This application is a National Phase Patent Application and claims priority to and benefit of International Application Number PCT/CN2010/000891, filed on Jun. 18, 2010, the entire disclosure of which is incorporated herein by reference.

TECHNICAL FIELD

The present invention belongs to the field of functional polymer composite materials, and relates to a perfluorinated ion exchange material compounded by a porous membrane grafted with functional groups.

BACKGROUND TECHNOLOGIES

Proton Exchange Membrane Fuel Cell is a power generation device which directly converts chemical energy into electrical energy in an electrochemical manner and is considered to be the most preferred clean and efficient power generation technology in the 21st century. Proton Exchange Membrane (PEM) is a key material for use in Proton Exchange Membrane Fuel Cell (PEMFC).

The perfluorosulfonic acid proton exchange membranes currently used have a good proton conductivity and chemical stability at a relatively low temperature (80° C.) and high humidity. However, they have many shortcomings, such as poor dimensional stability, low mechanical strength, bad chemical stability and so on. The membrane has different water absorption under different humidity, resulting in different expansion in size, when the membrane transforms under different operation conditions, the size of the membrane changes accordingly. Such case is repeated over and over again then mechanical damage is eventually caused to the proton exchange membrane. Moreover, a large number of substances with strong oxidability, such as hydroxyl radicals and hydrogen peroxide, are produced in a reaction at the positive electrode of a fuel cell, and these substances will attack the non-fluoro groups in the membrane-forming resin molecules, leading to chemical degradation, damage and blistering of the membrane. Finally, when the operating temperature of the perfluorosulfonic acid exchange membrane is higher than 90° C., the proton conductivity of the membrane is decreased sharply due to rapid dehydration of the membrane, thereby decreasing efficiency of the fuel cell greatly. However, high operating temperature can greatly improve the resistance of the fuel cell catalyst to carbon monoxides. In addition, the existing perfluorosulfonic acid membranes have some hydrogen or methanol permeability, especially in a direct methanol fuel cell, permeability of methanol is very high, which becomes a fatal problem. Therefore, how to improve strength of a perfluorosulfonic acid proton exchange membrane, dimensional stability, and efficiency of proton conduction at a high temperature, and to reduce permeability of the working medium and the like becomes a major issue that the fuel cell industry faces.

At present, some methods have been proposed to solve these problems. For example, Japanese Patent No. JP-B-5-75835 enhances strength of a membrane by impregnating a porous media made of polytetrafluoroethylene (PTFE) with a perfluorosulfonic acid resin. However, this PTFE porous medium cannot solve the problems above due to relative softness and insufficient reinforcing effect of the PTFE material. W. L. Gore Co., Ltd developed composite membrane liquid of Gore-Select series by filing Nafion ion conductive liquid with the porous Teflon (U.S. Pat. No. 5,547,551, U.S. Pat. No. 5,635,041, U.S. Pat. No. 5,599,614). This membrane has high proton conductivity and better dimensional stability, however, Teflon has large creep at a high temperature, resulting in performance degradation. Japanese Patent No. JP-B-7-68377 also proposes a method in which a porous media made of polyolefin is filled with a proton exchange resin, but such membrane has insufficient chemical durability and thus there is a problem in long-term stability. Furthermore, due to addition of the porous medium without proton conductivity, the number of proton-conduction pathways is reduced, and proton exchange capability of the membrane is decreased.

Furthermore, Japanese Patent No. JP-A-6-231779 proposes another method for reinforcement by using fluorine resin fibers. The membrane made by this method is an ion exchange membrane which is reinforced through a fluorocarbon polymer reinforcing material in the form of fibrils. However, in this method, it is required to add a relatively large amount of the reinforcing material; in this case, processing of the membrane tends to be difficult, and electrical resistance of the membrane may likely increase.

European Patent No, EP0875524B1 discloses a technology of reinforcing nafion membrane by using glassfiber membrane prepared by applying glassfiber nonwoven technology. Oxides such as silica are also mentioned in this patent. However, non-woven glass fiber cloth is a necessary substrate in this patent, which would greatly limit the application scope.

U.S. Pat. No. 6,692,858 discloses a technology in which a perfluorosulfonic acid resin is reinforced by polytetrafluoroethylene fibers. In this technology, the perfluorosulfonyl fluoride resin and the polytetrafluoroethylene fiber are mixed, extruded, and transformed to prepare a fiber-reinforced perfluorosulfonic acid resin. The method cannot be applied in continuous production due to the time-consuming transformation process.

However, the porous membrane or fiber is only simply mixed with a resin in the above technologies, since the nature of the membrane or fiber differs greatly from the membrane-forming resin, even they are mutually exclusive, it is extremely easy to form gaps between the membrane-forming molecules and reinforcing object, sometimes some pores of the reinforced microporous membrane cannot be filled with the resin. Thus, such a membrane often has high gas permeability, and when the membrane is working in the fuel cell, high permeability tends to result in the energy loss and damage to the cell caused by overheating.

SUMMARY OF THE INVENTION

One object of the present invention is to provide a composite material which is formed by compounding an ion exchange resin with a porous fluoropolymer membrane, wherein nitrile groups of the ion exchange resin and nitrile groups grafted on the porous fluoropolymer membrane form a triazine ring crosslinked structure, so that the composite material has excellent mechanical properties and gas impermeability, as well as high ion exchange capacity and electrical conductivity. Another object of the present invention is to provide a method for preparing said composite material. Yet another object of the present invention is to provide an ion exchange membrane made from the above-mentioned composite material. Still another object of the present invention is to provide a fuel cell containing the above-mentioned ion exchange membrane. And still yet another object of the present invention is to provide a use of the above-mentioned composite material.

The above-mentioned objects of the present invention can be achieved by adopting the following technical schemes.

In one aspect, the present invention provides a composite material which is formed by filing micropores and covering surface of a porous fluoropolymer membrane with one or more ion exchange resins having an ion exchange function; wherein pore surfaces of the porous fluoropolymer membrane are modified by nitrile group-containing functional monomers through grafting; and at least one of the ion exchange resins forming the composite material contains nitrile groups which form a triazine ring crosslinked structure with nitrile groups of the functional monomers grafted on the porous fluoropolymer membrane.

Preferably, said nitrile group-containing functional monomer is one or more combinations selected from of a group consisting of substances as defined in the following formula (I)

$e=1\sim3$;

said nitrile group-containing ion exchange resins is one or more combination selected from of a group consisting of resins as defined in the following formula (II) and/or formula (III):

wherein $e=1\sim3$, $n=0$ or $1$, $m=2\sim5$; $x$, $y=$an integer of $3\sim15$;

wherein a, b, c=an integer of 3~15; a', b', c'=an integer of 1~3; j=0~3.

Preferably, the composite material may further comprise one or more combinations selected from a group consisting of resins as defined in the following formula (IV) and/or formula (V) and/or formula (VI):

wherein x=3~15, n=0~2, p=2~5;

wherein, c, d=an integer of 3~15, and c', d'=an integer of 1~3;

wherein f, g, h=an integer of 3~15; f', g', h'=an integer of 1~3; i=0~3; M, M'=H, K, Na or $NH_4$.

The above-mentioned resins as defined in the formulas (II), (III), (IV), (V) and (VI) have an ion exchange capacity of 0.80~1.60 mmol/g and a number average molecular weight of 150,000~450,000.

Preferably, material of the porous fluoropolymer membrane in said composite material is selected from porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane, which may be uniaxial tensile membranes or biaxial tensile membranes; and the porous fluoropolymer membrane in said composite material has a thickness of not greater than 100 μm, a porosity of 50~97% and a pore size of 0.1~10 μm; preferably, the porous fluoropolymer membrane has a thickness of 5~20 μm, a porosity of 60~97%, and a pore size of 0.2~5 μm.

Preferably, the composite material may further contain a high-valence metal compound, part of acidic exchange groups of the ion exchange resin form physical bonding in between through the high-valence metal compound, and part of the high-valence metal compound is also a catalyst used for forming a triazine ring; preferably, said high-valence metal compound forming the physical bonding is one or more combinations selected from a group consisting of compounds of the following elements: W, Zr, Ir, Y, Mn, Ru, Ce, V, Zn, Ti, and La; more preferably, the high-valence metal ion compound is selected from a group consisting of nitrates, sulfates, carbonates, phosphates, acetates of these metal elements in the highest valence state and intermediate valence state or double salts thereof; or one or more selected from a group consisting of cyclodextrins, crown ethers, acetylacetones, nitrogen-containing crown ethers and nitrogen-containing heterocyclic rings, EDTA, DMF, and DMSO complexes of these metal elements in the highest valence state and intermediate valence state; selected from a group consisting of hydroxides of these metal elements in the highest valence state and intermediate valence state; or selected from a group consisting of oxides of these metal elements in the highest valence state and intermediate valence state which have a perovskite structure, including but not limited to compounds of $Ce_xTi_{(1-x)}O_2$ (x=0.25~0.4), $Ca_{0.6}La_{0.27}TiO_3$, $La_{(1-y)}Ce_yMnO_3$ (y=0.1~0.4) and $La_{0.7}Ce_{0.15}Ca_{0.15}MnO_3$; the high-valence metal compound is added in an amount of 0.0001~5 wt %, preferably 0.001~1 wt % of the resin.

In another aspect, the present invention provides a method for preparing the above-mentioned composite material, which comprises: adding a trace of strong protonic acid and/or Lewis acid as a catalyst into the material during compounding, to allow nitrile groups of at least one nitrile group-containing ion exchange resin and nitrile groups of functional monomers grafted on the porous fluoropolymer membrane to form a triazine ring crosslinked structure; preferably, the protonic acid is selected from $H_2SO_4$, $CF_3SO_3H$ or $H_3PO_4$; the Lewis acid is selected from $ZnCl_2$, $FeCl_3$, $AlCl_3$, organotin, organic antimony or organic tellurium. For the method of forming triazine ring crosslinking, please refer to U.S. Pat. No. 3,933,767 and EP1464671A1. The Lewis acid or protonic acid is added in an amount of 0.1~1 wt % of the resin.

Preferably, the method for preparing the composite material containing a high-valence metal ion compound comprises the following steps:

(1) Mixing a solution of high-valence metal compound and an acidic crosslinking catalyst with an dispersion solution of ion exchange resin, and then compounding the mixed solution with nitrile group-grafted porous fluoropolymer membrane with a micropore structure by performing pouring, tape casting, screen printing process, spraying or impregnating process;

(2) Subjecting a wet membrane to heat treatment at 30~300° C. to obtain a composite material forming a triazine ring crosslinked structure;

wherein a solvent used in the processes of pouring, tape casting, screen printing, spraying, impregnating and other processes, is selected from one or more of a group consisting of dimethylformamide, dimethylacetamide, methyl formamide, dimethylsulfoxide, N-methylpyrrolidone, hexamethylphosphoric acid amine, acetone, water, ethanol, methanol, (n-)propanol, isopropanol, ethylene glycol and/or glycerol; preparation is performed under the following conditions: concentration of the resin dispersion solution being 1~80%, temperature of heat treatment being 30~300° C., and time of heat treatment being 1~600 minutes; preferably under the following conditions: concentration of the resin dispersion solution being 5~40%, temperature of heat treatment being 120~250° C., and time of heat treatment being 5~200 minutes.

Preferably, said high-valence metal compound is added in an amount of 0.0001~5 wt % , preferably 0.001~1 wt % of the resin; said acidic crosslinking catalyst is preferably a protic acid and/or Lewis acid, and is added in an amount of 0.1~1 wt % of the resin.

In yet another aspect, the present invention provides an ion exchange membrane made from the above-mentioned composite material.

In still another aspect, the present invention provides a fuel cell containing the above-mentioned ion exchange membrane.

In still yet another aspect, the present invention provides a use of the above-mentioned composite material in manufacturing an ion exchange membrane of a fuel cell.

Compared with the prior art, the present invention has at least the following advantages:

In the composite material of the present invention, there is at least one ion exchange resin containing nitrile groups, and the nitrile groups of the ion exchange resin and nitrile groups grafted on the porous membrane form a triazine ring crosslinked structure. Due to formation of the triazine ring crosslinked structure, the composite material can form a tight integral structure. In a preferred embodiment, a physical bond crosslinked structure is formed between the high-valence metal and the acidic group of the ion exchange resin, and a complex bond is also formed between the triazine ring and the high-valence metal. Therefore, the ion exchange membrane made from the composite material of the present invention has a high ion exchange capacity, as well as good mechanical strength, gas impermeability and stability. Compared with the ion exchange membranes made from ordinary composite materials, the ion exchange membrane made from the composite material of the present invention is superior to the ordinary ion exchange membranes in terms of performances such as electrical conductivity, tensile strength, hydrogen permeation current, and dimensional change rate.

The following is detailed description of the present invention.

The perfluorosulfonic acid ion membrane used in a fuel cell needs to meet the following requirements: being stable, having high electrical conductivity and high mechanical strength. Generally, with an increase of ion exchange capacity, equivalent weight value of the perfluoropolymer decreases (when the Equivalent Weight (EW) value decreases, the Ion Exchange Capacity (IEC)=1,000/EW) and the strength of the membrane also decreases in the meanwhile. Gas permeability of the membrane will also rise accordingly, which will bring very serious effects to fuel cells. Therefore, preparing the membrane having a high ion exchange capacity, as well as good mechanical strength, gas impermeability and stability is the key in practical applications of fuel cells, especially fuel cells in delivery vehicles such as automobiles.

Figure 1:
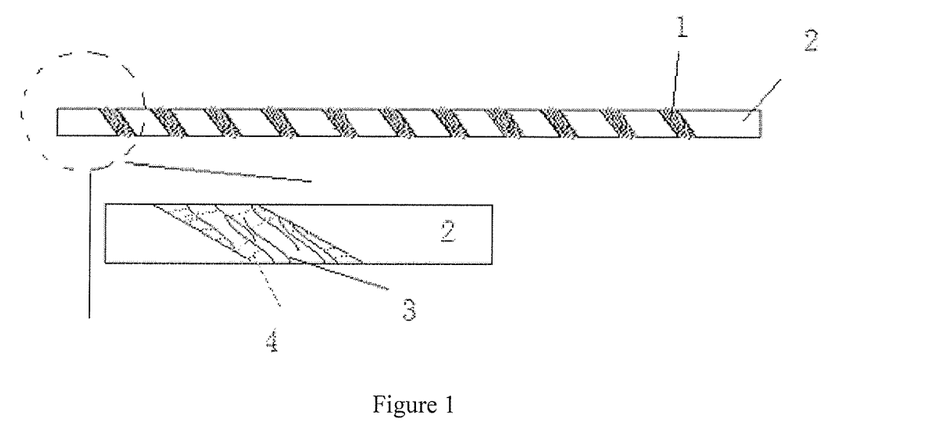
FIG. 1 shows an ion exchange resin crosslinked and bonded with a porous membrane.

In view of the deficiencies existing in the prior art, the present invention provides a composite material and method for preparing the composite material. The composite material provided in the present invention uses a porous membrane as a reinforcing material, which changes the previous method of filling the ion exchange resin into the porous membrane structure by forming triazine ring crosslinking between the porous membrane and the ion exchange resin (as shown in FIG. 1). The composite material obtained has very high mechanical properties and gas impermeability.

The present invention provides a composite material which is characterized in that:

(a) Said composite material is formed by filing micropores and covering surfaces of a porous fluoropolymer membrane with one or more ion exchange resins having an ion exchange function;

(b) The pore surfaces of said porous fluoropolymer membrane are modified by nitrile group-containing functional monomers through grafting; and

(c) At least one of the ion exchange resins forming the composite material comprises nitrile groups, and the nitrile groups of the ion exchange resin and the functional monomers grafted on the porous fluoropolymer membrane can form a triazine ring crosslinked structure (as shown in X).

The selected porous fluoropolymer membrane with a microporous structure, grafted by a substance with ion exchange function has a thickness of no greater than 100 μm, a porosity of 50~97% and a pore size of 0.1~10 μm; preferably, the porous fluoropolymer membrane has a thickness of 5~20 μm, a porosity of 60~97% and a pore size of 0.2~5 μm. These porous fluoropolymer membranes are characterized in that: the material of the porous fluoropolymer membrane is selected from porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane. These membranes may be uniaxial tensile membranes or biaxial tensile membranes.

The nitrile group-containing functional monomer grafted on the porous membrane is one or more substances as defined in the following formula (I):

(I)

$e=1\sim3$.

Grafting methods include one or more of the following methods: porous fluoropolymer membrane reacts with grafting monomers by such means as heat, light, electron radiation, plasma, X-ray, radical initiator, and then the grafted membrane produces ion exchange groups in the presence of an acid or base. Specific preparation methods are disclosed in many publications, for example, the preparation method can be referred to the method of modification of macroporous PTFE membranes grafted with plasma described in "Study on Plasma-Induced Graft Modification of Acrylic Acid onto PTFE Membranes", Technology and Development of Chemical Industry, 2006, Vol. 35, Iss. 04.

In the composite material provided by the present invention, the ion exchange resin containing nitrile groups may be one or more combinations polymers comprising repeated structures defined in the following formulas (II) and/or (III):

(II)

($e=1\sim3$, $n=0$ or 1, $m=2\sim5$; and x, $y=$an integer of 3~15);

(a, b, c=an integer of 3~15; a', b', and c'=an integer of 1~3; $j=0\sim3$.

The ion exchange resin used in the present invention may be one or more combinations of polymers comprising repeated structures of the following formulas (IV) and/or (V) and/or (VI):

(IV)

wherein $x=3\sim15$, $n=0\sim2$, $p=2\sim5$;

(V)

wherein c, d=an integer of 3~15, and c', d'=an integer of 1~3;

(III)

(VI)

wherein f, g, h=an integer of 3~15; f', g', h'=an integer of 1~3; i=0~3; M, M'=H, K, Na or $NH_4$.

Said resin has an ion exchange capacity of 0.80~1.60 mmol/g and a number average molecular weight of 150,000~450,000;

The perfluorosulfonic acid resins defined in the formulas (IV), (V) and (VI) must be mixed with the perfluorosulfonic acid resin defined in the formula (II) or (III) when they are used.

Figure 2:
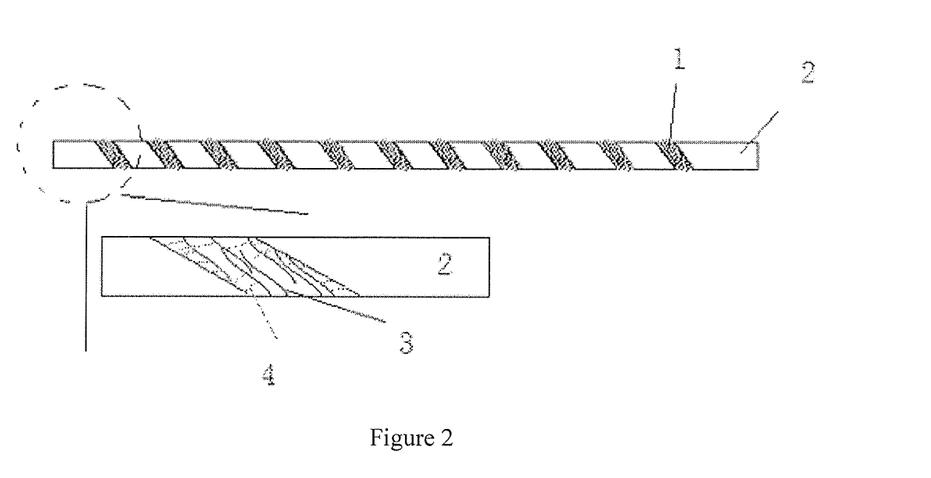
FIG. 2 shows a schematic diagram illustrating chemical crosslinking. wherein "1" represents a perfluorinated ion exchange resin, "2" represents a porous membrane, "3" represents a molecule of perfluorinated ion exchange resin, and "4" represents chemical crosslinking.

Said chemical bonds are crosslinked through a triazine ring formed between the nitrile groups of the functional molecule grafted on the porous fluoropolymer membrane and the nitrile groups of the ion exchange resin, as shown in FIG. 2.

The method of forming a triazine ring crosslinked structure between the nitrile groups of the ion exchange resin and the nitrile groups of the porous fluoropolymer membrane comprises: adding a trace of strong protonic acid and/or Lewis acid as a catalyst into the material during formation of the membrane; preferably, the protonic acid is selected from $H_2SO_4$, $CF_3SO_3H$ or $H_3PO_4$; the Lewis acid is selected from $ZnCl_2$, $FeCl_3$, $AlCl_3$, organotin, organic antimony or organic tellurium. For the method of forming triazine ring crosslinking, please refer to U.S. Pat. No. 3,933,767 and EP1464671A1. Typically, the Lewis acid or protonic acid is added in an amount of 0.1~1 wt % of the resin.

A high-valence metal compound may be further added into the composite material provided in the present invention, so that part of acidic exchange groups of the ion exchange resin form physical bonding in between through the high-valence metal compound. Of course, part of the high-valence metal compound is also a catalyst used for forming a triazine ring crosslinked structure.

Said high-valence metal compound forming the physical bonding is one or more combinations selected from compounds of the following elements: W, Zr, Ir, Y, Mn, Ru, Ce, V, Zn, Ti, and La.

Said high-valence metal compound forming the physical bond is selected from one or more of the group consisting of the following elements: W, Zr, Ir, Y, Mn, Ru, Ce, V, Zn, Ti, and La.

Said high-valence metal ion compound is one or more selected from a group consisting of nitrates, sulfates, carbonates, phosphates, acetates of the metal elements or double salts thereof in the highest valence state and intermediate valence state. Said high-valence metal ion compound is selected from cyclodextrins, crown ethers, acetylacetones, nitrogen-containing crown ethers and nitrogen-containing heterocyclic rings, EDTA, DMF, and DMSO complexes of these metal elements in the highest valence state and intermediate valence state. Said high-valence metal ion compound is selected from hydroxides of these metal elements in the highest valence state and intermediate valence state. Said high-valence metal ion compound is selected from oxides of these metal elements in the highest valence state and intermediate valence state which have a perovskite structure, including but not limited to compounds of $Ce_xTi_{(1-x)}O_2$ (x=0.25~0.4), $Ca_{0.6}La_{0.27}TiO_3$, $La_{(1-y)}Ce_yMnO_3$ (y=0.1~0.4) and $La_{0.7}Ce_{0.15}Ca_{0.15}MnO_3$. The high-valence metal compound is added in an amount of 0.0001~5 wt %, preferably 0.001~1 wt %.

The method for preparing said composite material containing a high-valence metal compound comprises the following steps:

(1) Preparing a dispersion solution of the ion exchange resin, and mixing a solution of the high-valence metal compound and an acidic crosslinking catalyst with the dispersion solution of the resin, then compounding the mixed solution with nitrile group-grafted porous fluoropolymer membrane with a micropore structure by performing pouring, tape casting, screen printing process, spraying, or impregnating process;

(2) Treating a wet membrane t at 30250° C.;

(3) Obtaining the composite material in which a crosslinking bond is formed between the membrane-forming resin and the porous fluoropolymer membrane after treatment.

A solvent used in the processes of pouring, tape casting, screen printing, spraying, impregnating and other processes is one or more selected from a group consisting of dimethylformamide, dimethylacetamide, methylformamide, dimethylsulfoxide, N-methylpyrrolidone, hexamethylphosphoric amine, acetone, water, ethanol, methanol, (n-)propanol, isopropanol, ethylene glycol and/or glycerol; concentration of the resin solution adopted is 1~80%, preferably 5~40%; temperature of heat treatment is 30~300° C., preferably 120~250° C.; and time of heat treatment is 1~600 minutes, preferably 5~200 minutes.

In another aspect, the present invention provides an ion exchange membrane made from the above-mentioned composite material.

In yet another aspect, the present invention provides a fuel cell comprising the above-mentioned ion exchange membrane.

In still another aspect, the present invention provides a use of the above-mentioned composite material in manufacturing an ion exchange membrane of a fuel cell.

The beneficial effects of the present invention include:

The composite material provided in the present invention is obtained by forming triazine ring bonding between a graft-modified porous membrane and an ion exchange resin, and has an excellent chemical stability, mechanical properties and gas impermeability due to formation of a triazine ring crosslinked structure between the porous membrane and the membrane-forming resin used. In a preferred embodiment, a physical bonding crosslinked structure is formed between part of the acidic groups in the membrane-forming molecule through a high-valence metal, and a complex bond is also formed between the triazine ring and the high-valence metal, therefore the composite material disclosed is a tight integral structure, rather than simply blending ion exchange resin and porous membrane together in the prior art. The ion exchange membrane provided in the present invention resolves the problems that the conventional microporous composite membrane has a poor gas impermeability and the ion exchange resin is easily separated from the microporous membrane.

BEST MODES OF THE PRESENT INVENTION

The present invention will be further illustrated in combination with embodiments, which are not used to limit the present invention.

Example 1

A chqistex polytetrafluoroethylene membrane (Ningbo) with a thickness of 15 μm a porosity of 80% and a pore size of 1 μm was placed in a plasma generator and a plasma generated at a pressure of 1 Pa with Ar as working gas was grafted with the monomer (wherein e=1).

The grafted polytetrafluoroethylene membrane was impregnated in an ethanol-water solution containing 25% perfluorosulfonic acid resin with a trace of triphenyltin and 1% cerium (III) nitrate, wherein the structural formula of the perfluorosulfonic acid resin is defined in formula (II).

(wherein e=1; n=1; m=2; x=13; y=11, number average molecular weight: 250,000).

The wet membrane was then treated at 190° C. for 20 minutes to obtain a crosslinked composite membrane with a thickness of 16 μm.

Example 2

A 15% mixed perfluorosulfonic acid resin solution comprises a resin A, the structure formula of which is (x=5; n=0; p=2; exchange capacity 1.35 mmol/g, number average molecular weight: 260,000) and resin B, the structure formula of which is (e=2, n=1, m=3, x=10, y=5, number-average molecular weight 230,000). Said mixed resin solution (the mass ratio of A to B is 5:1) a (n-)propanol-water mixed solution comprising a trace of triphenyltin and also 0.2% manganese (II) nitrate, was sprayed on a chqistex polytetrafluoroethylene membrane (Ningbo) with a thickness of 10 μm, a porosity of 85% and a pore size of 0.5 μm grafted with (wherein e=2) according to the graft method in Example 1.

Then a sample of the wet membrane was dried in an oven at 2,000° C. for 60 seconds. In order to block the pores in the membrane completely, this step may be repeated for more than two times. Finally, the composite membrane was treated at 150° C. for 30 minutes to obtain a composite membrane with a thickness of 20 μm.

Example 3

An isopropanol-(n-)propanol-water solution with a mass concentration of 10% was prepared by a perfluorosulfonic acid resin A comprising repeating units as shown in structure formula (IV)

(x=4, n=0, p=4, exchange capacity: 1.25 mmol/g, number average molecular weight: 230,000) and a perfluorosulfonic acid resin B comprising repeating units as shown in structure formula (II)

(e=3, n=1, m=4, x=7, y=9, number average molecular weight: 250,000)
(the mass ratio of A to B is 5:1). The isopropanol-(n-)propanol-water solution further comprised 5% La (III)-DMF complex and a trace of triphenyltin.

A chqistex polytetrafluoroethylene membrane (Ningbo) with a thickness of 10 μm, a porosity of 90% and a pore size of 2~3 μm which was grafted with

(wherein e=3) according to the graft method in Example 1 was heated with the above-mentioned isopropanol-(n-)propanol-water solution at 240° C. for 10 minutes by following the screen printing method to obtain a membrane with a thickness of 11 μm.

Example 4

A polyvinylidene fluoride membrane with a thickness of 30 μm, a porosity of 79% and a pore size of 5 μm which was grafted with both (wherein e=3)
and (wherein e=1)
(mass ratio of the two monomers is 1:1) (produced by Zhejiang (Torch) Xidoumen Membrane Industry Co., Ltd according to the same grafting method as depicted in Example 1) was impregnated in the DMF solution of 5% perfluorosulfonic acid resin which was further mixed with a trace of triphenyltin and 0.05% Ce-DMF complex, wherein the structural formula of repeating units of the perfluorosulfonic acid resin is.

(e=3, n=1, m=4, x=7, y=11, number average molecular weight: 250,000)

Then a sample of the wet membrane was dried at 100° C. for 20 seconds in an oven and then treated at 190° C. for 20 minute to obtain a composite membrane with a thickness of 31 μm.

Example 5

A chqistex polytetrafluoroethylene membrane (Ningbo) with a thickness of 50 μm, a porosity of 95% and a pore size of 0.5 μm which was grafted with both

(wherein e=2)

and (wherein e=1) (mass ratio of the two monomers is 1:1) according to the grafting method in Example 1, was fixed by a tensioning device around the membrane.

A DMSO solution containing 30% perfluorosulfonic acid resin, 0.01% zinc nitrate and a trace of triphenyltin was sprayed on both sides of the polytetrafluoroethylene-ethylene membrane, wherein the structural formula of the perfluorosulfonic acid resin is shown in formula (III), with (a=9; b=6; c=3; a'=b'=c'=1; j=1, number average molecular weight: 250,000).

Then a sample of the wet membrane was dried at 250° C. for 30 seconds in an oven. In order to block the pores in the membrane completely, this step may be repeated for more than two times. Finally, the composite membrane was treated at 200° C. for 20 minutes to obtain a composite membrane with a thickness of 50 μm.

Example 6

A chqistex polytetrafluoroethylene porous membrane (Ningbo) with a thickness of 25 μm, a porosity of 70% and a pore size of 1 μm which was grafted with the two nitrile group-containing monomers that are the same as those in Example 5 (mass ratio of the two monomers is 2:1) according to the grafting method in Example 1 was fixed on a plate. And a (n-)propanol-water solution containing 20% perfluorosulfonic acid resin, 2% manganese (II) carbonate and a trace of triphenyltin was sprayed on a fixed polytrifluorochloroethylene porous membrane, wherein the structural formula of the perfluorosulfonic acid resin is shown in formula (III)

(a=11; b=7; c=5; a'=b'=c'=1; j=1, number average molecular weight: 2,600,000). A sample of the wet membrane was dried at 1800° C. for 20 minutes in an oven, then the ion exchange resin contacting the polytetrafluoroethylene porous membrane was pressed into pores of the membrane through the hot pressing process to prepare a composite membrane.

Example 7

A chqistex polytetrafluoroethylene membrane (Ningbo) with a thickness of 10 μm, a porosity of 80% and a pore size of 1 μm which was grafted with both (I)

(wherein e=3)
and (I)

(wherein e=1) (mass ratio of the two monomers is 1:3) according to the grafting method in Example 1 was fixed by a tensioning device around the membrane.

A 30% mixed perfluorosulfonic acid resin was soaked in an NMP solution containing 5% cyclodextrin-vanadium and a trace of tetraphenylantimony; wherein the mixed perfluorosulfonic acid resin comprises resin A and resin B, the structural formula of the resin A is shown in formula (V)

(V)

(c=7; d=5; c'=d'=1, number average molecular weight: 250,000) and the structural formula of the resin B is shown in formula (II), (II)

(e=2; n=1; m=3; x=9; y=10, number average molecular weight: 250,000) and the mass ratio of the resin A to resin B is 1:2 in the mixed resin solution. The mixed resin solution was tape-cast on the taut surface of the porous membrane, and the solvent was removed by gently heating with a blower. Then the other side of the porous membrane was coated with an ethanol-water solution of 14% perfluorosulfonic acid resin, wherein the structural formula of the perfluorosulfonic acid resin is shown in formula (IV)

(IV)

(x=4.5; n=0; p=4; exchange capacity: 1.20 mmol/g, number average molecular weight: 290,000).

The ethanol-water solution was allowed to completely penetrate into the pores of the polytetrafluoroethylene membrane to reach the continuous resin layer at the first surface directly, and then a sample of the wet membrane was dried at 230° C. for 20 minutes in an oven to obtain a composite membrane.

Example 8

The first surface of a chqistex polytetrafluoroethylene membrane (Ningbo) with a thickness of 80 μm, a porosity of 97% and a pore size of 4 μm which was grafted with (I)

(e=3) according to the grafting method in Example 1 was coated with a methanol-water solution containing 10% mixed perfluorosulfonic acid resin, 10% manganese sulfate and a trace of triphenyltin, wherein the mixed perfluorosulfonic acid resin comprises resin A with a structure formula as (III)

($a=9$, $b=7$, $c=5$, $j=1$, number average molecular weight: 230,000)
and resin B with a structural formula as (IV)

($x=4.5$; $n=0$; $p=4$; exchange capacity 1.20 mmol/g, number average molecular weight 290,000) and the mass ratio of the resin A to resin B is 1:1. Then the solvent was removed from the wetted polytetrafluoroethylene membrane by gently heating with a blower. Int order to form a continuous layer of the ion exchange resin on the surface of the polytetrafluoroethylene membrane, this process were required to be repeated for more than two times. The membrane was then heated at 150° C. for 2 minutes to obtain a composite membrane.

Example 9

A propanol-water solution containing 15% perfluorosulfonic acid resin as defined in structural formula (IV):

(IV)

($x=4$, $n=0$, $p=2$, exchange capacity: 1.45 mmol/g; number average molecular weight: 270,000), 3% bipyridine-Ru complex and a trace of triphenyltin was sprayed onto a polytetrafluoroethylene membrane with a thickness of 10 μm, a porosity of 85% and a pore size of 0.5 μm which was grafted with (I)

($e=1$) according to the grafting method in Example 1;

Then a sample of the wet membrane was dried at 140° C. for 30 seconds in an oven. In order to block the pores in the membrane completely, this step may be repeated for more than two times. Finally, the composite membrane was treated at 1,500° C. for 30 minutes to obtain a membrane with a thickness of 20 μm.

Further, a propanol-water solution of the resin comprising repeating units as shown in the structure formula (II):

(II)

($e=1$, $n=1$, $m=4$, $x=7$, $y=13$, number average molecular weight: 230,000) was sprayed onto the membrane obtained from the above with a thickness of 20 μm, then the membrane obtained above was composited with monolayer membrane by hot pressing to obtain a composite membrane of the present invention.

Example 10

A propanol-water solution containing 15% perfluorosulfonic acid resin as defined in structural formula (IV):

(IV)

($x=4$; $n=0$; $p=2$; exchange capacity: 1.45 mmol/g; number average molecular weight: 270,000) and a trace of triphenyltin was sprayed onto a polytetrafluoroethylene membrane with a thickness of 10 μm, a porosity of 85% and a pore size of 0.5 μm which was grafted with (e=1) according to the grafting method in Example 1.

Then a sample of the wet membrane was dried at 140° C. for 30 seconds in an oven. In order to block the pores in the membrane completely, this step may be repeated for more than two times. Finally, the composite membrane was treated at 1,500° C. for 30 minutes to obtain a membrane with a thickness of 20 μm.

Further, a propanol-water solution of the resin comprising repeating units as defined in structure formula (II)

(e=1; n=1; m=4; x=7; y=13; number average molecular weight: 230000) was sprayed onto the membrane obtained from the above with a thickness of 20 μm. Then the membrane obtained above was composited with tmonolayer membrane by hot pressing to obtain a composite membrane of the present invention.

Example 11

An isopropanol-propanol-water solution containing 15% perfluorosulfonic acid resin was prepared, wherein the structural formula of the perfluorosulfonic acid resin is shown in formula (IV):

(x=4.6; n=0; p=4; exchange capacity: 1.18 mmol/g; number average molecular weight: 180,000).

Then an ordinary composite ion membrane with a thickness of 20 μm was obtained by using a polytetrafluoroethylene membrane with a thickness of 20 μm, a porosity of 90% and a pore size of 2~3 μm and the above isopropanol-propanol-water solution by following the screen printing method.

Example 12

Preparation and Characterization of Fuel Cell Membrane Electrode Assembly

Preparation of Gas Diffusion Layer (GDL):

Torry090 carbon paper was impregnated in a 25% PTFE emulsion for an appropriate period of time, followed by hydrophobic treatment The amount of the impregnated PTFE was determined by weighing method. Then the carbon paper impregnated with PTFE was placed in a muffle furnace and roasted at 340° C. so as to remove the surfactant in the PTFE emulsion impregnated in the carbon paper and also make the PTFE thermally melted and sintered and dispersed uniformly on the fibers of the carbon paper, and thereby to achieve a good hydrophobic effect. The mass fraction of PTFE in the roasted carbon paper was about 30%. A certain amount of carbon powder, PTFE, and an appropriate amount of isopropanol aqueous solution were mixed, oscillated with ultrasonic for 15 minutes, and then coated onto the carbon papers by adopting brush coating process, and the coated carbon papers were roasted at 340° C. for 30 minutes, respectively, to prepare a gas diffusion layer.

Preparation of Membrane Electrode Assembly (MEA):

The amount of Pt loaded in the catalyst layer was 0.4 mg/cm$^2$; a certain amount of 40% Pt/C (JM Company) electrocatalyst, deionized water and isopropanol were mixed, oscillated with ultrasonic wave for 15 minutes; after adding a certain amount of 5% resin solution of Example 12, ultrasonic oscillation was proceeded for another 15 minutes; after the solution turnred ito an ink-like solution through ultrasonic processing, the mixed solution was sprayed onto the membrane of Example 2 uniformly to obtain a membrane electrode assembly (MEA).

Figure 3:
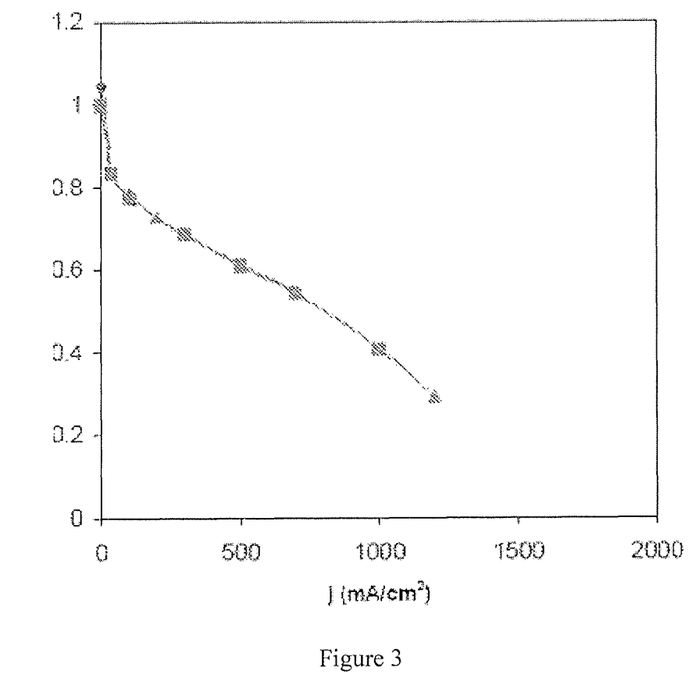
FIG. 3 shows a polarization curve of a single cell.

The prepared membrane electrode assembly and the leveled gas diffusion layer were combined to assemble a single cell, and galvanostatic polarization performance test was performed in a self-designed dual-channel low-power testing platform under test conditions as follows: effective active area of a single cell was 50 cm$^2$; pressures of H$_2$ and air were both 1.0 bar; H$_2$ utilization rate was 70%; air utilization rate was 40%, relative humidity was 50%; and cell operating temperature was (95)° C. The polarization curve test was performed after the prepared electrode was activated, and the data was recorded at an interval of 1 minute after the respective measuring points were stabilized for 2 minutes so as to draw a polarization curve (FIG. 3).

Example 13

This example is used to illustrate various performances of the composite membranes prepared in Examples 1-11.

The performances of all membranes were characterized and the results are shown in Table 1. It can be seen from Table 1 that the electrical conductivity at 95° C., tensile strength, hydrogen permeation current, dimensional change rate, and other performances of the composite membrane of the present invention are all superior to those of an ordinary composite ion exchange membrane. The test conditions of the electrical conductivity value were as follows: T=95° C., under saturated humidity; and T=25° C., dried in a drier for two days; the method for testing the tensile strength was a GB standard method (GB/T20042.3~2009), and the method for testing the hydrogen permeation current was an electrochemical method (Electrochemical and Solid-State Letters, 10, 5, B101-B104, 2007).

TABLE 1

Characteristics of various membranes

| | Nos. | Testing Condition and Method | Results |
|---|---|---|---|
| Electrical Conductivity (S/cm) | Membrane of Example 10 | T = 95° C., under saturated humidity; or T = 25° C., dried in a drier for two days | 0.0310/0.0119 |
| | Membrane of Example 11 | | 0.0216/0.0041 |
| | Membrane of Example 1 | | 0.0286/0.0108 |
| | Membrane of Example 2 | | 0.0275/0.0131 |
| | Membrane of Example 3 | | 0.0292/0.0113 |
| | Membrane of Example 4 | | 0.0287/0.0118 |
| | Membrane of Example 5 | | 0.0298/0.0119 |
| | Membrane of Example 6 | | 0.0297/0.0113 |
| | Membrane of Example 7 | | 0.0299/0.0111 |
| | Membrane of Example 8 | | 0.0301/0.0132 |
| | Membrane of Example 9 | | 0.0312/0.0119 |
| Tensile Strength (MPa) | Membrane of Example 10 | GB standard method | 33 |
| | Membrane of Example 11 | | 30 |
| | Membrane of Example 1 | | 36 |
| | Membrane of Example 2 | | 35 |
| | Membrane of Example 3 | | 36 |
| | Membrane of Example 4 | | 35 |
| | Membrane of Example 5 | | 34 |
| | Membrane of Example 6 | | 37 |
| | Membrane of Example 7 | | 35 |
| | Membrane of Example 8 | | 38 |
| | Membrane of Example 9 | | 36 |
| Hydrogen Permeation Current (mA/cm$^2$) | Membrane of Example 10 | Electrochemical method | 2.1 |
| | Membrane of Example 11 | | >4 |
| | Membrane of Example 1 | | 0.12 |
| | Membrane of Example 2 | | 0.12 |
| | Membrane of Example 3 | | 0.09 |
| | Membrane of Example 4 | | 0.10 |
| | Membrane of Example 5 | | 0.11 |
| | Membrane of Example 6 | | 0.11 |
| | Membrane of Example 7 | | 0.09 |
| | Membrane of Example 8 | | 0.08 |
| | Membrane of Example 9 | | 0.09 |
| Dimensional Change Rate (%) | Membrane of Example 10 | (GB/T20042.3-2009) | 2.5 |
| | Membrane of Example 11 | | 8.1 |
| | Membrane of Example 1 | | 0.6 |
| | Membrane of Example 2 | | 1.1 |
| | Membrane of Example 3 | | 0.6 |
| | Membrane of Example 4 | | 1.0 |
| | Membrane of Example 5 | | 1.1 |
| | Membrane of Example 6 | | 1.6 |
| | Membrane of Example 7 | | 1.1 |
| | Membrane of Example 8 | | 1.2 |
| | Membrane of Example 9 | | 1.4 |

The invention claimed is:

1. A composite material comprising: one or more ion exchange resins having an ion exchange function; and a porous fluoropolymer membrane, wherein
   (a) said one or more ion exchange resins having an ion exchange function is/are filled in micropores of said porous fluoropolymer membrane and covered on surfaces of said porous fluoropolymer membrane;
   (b) the pore surfaces of said porous fluoropolymer membrane are modified by nitrile group-containing functional monomers through grafting; and
   (c) at least one of the ion exchange resins forming the composite material comprises nitrile groups, and the nitrile groups and that of the functional monomers grafted on the porous fluoropolymer membrane form a triazine ring crosslinked structure.

2. The composite material according to claim 1, wherein said nitrile group-containing functional monomer is one or more combinations selected from substances as defined in the following formula (I):

wherein e=1~3;
said ion exchange resin containing nitrile groups is one or more combinations of resins as defined in the following formula (II) and/or formula (III):

wherein e=1~3; n=0 or 1; m=2~5; x, y=an integer of 3~15;

(III)

wherein a, b, c=an integer of 3~15; a', b', and c'=an integer of 1~3; and j=0~3.

3. The composite material according to claim 2, wherein said composite material further comprises one or more combinations of resins as defined in the following formula (IV) and/or formula (V) and/or formula (VI):

(IV)

wherein $x=3\sim15$; $n=0\sim2$; $p=2\sim5$; ion exchange capacity: 0.90~1.60 mmol/g;

(V)

wherein c, d=an integer of 3~15, and c', d'=an integer of 1~3;

(VI)

wherein f, g, h=an integer of 3~15; f', g', h'=an integer of 1~3; i=0~3; M, M'=H, K, Na or $NH_4$.

4. The composite material according to claim 3, wherein said resins as defined in the formulas (II), (III), (IV), (V) and (VI) have an ion exchange capacity of 0.80~1.60 mmol/g and a number average molecular weight of 150,000~450,000.

5. The composite material according to claim 4, wherein material of said porous fluoropolymer membrane is selected from porous polytetrafluoroethylene membrane, polytetrafluoroethylene-hexafluoropropylene membrane, porous polyvinylidene fluoride membrane (PVDF), porous polytrifluorochloroethylene membrane and porous polytetrafluoroethylene-ethylene (ETFE) membrane, which are uniaxial tensile membranes or biaxial tensile membranes; and said porous fluoropolymer membrane has a thickness of not greater than 100 μm, a porosity of 50~97% and a pore size of 0.1~10 μm.

6. The composite material according to claim 5, wherein the porous fluoropolymer membrane has a thickness of 5~20 μm, a porosity of 60~97%, and a pore size of 0.2~5 μm.

7. The composite material according to claim 5, wherein said composite material further comprises a high-valence metal compound, part of acidic exchange groups of the ion exchange resin form physical bonding in between through the high-valence metal compound, and part of the high-valence metal compound is also a catalyst used for forming a triazine ring crosslinked structure.

8. The composite material according to claim 7, wherein the high-valence metal compound forming the physical bonding is one or more combinations selected from a group consisting of compounds of the following elements: W, Zr, Ir, Y, Mn, Ru, Ce, V, Zn, Ti, and La.

9. The composite material according to claim 8, wherein the high-valence metal compound is selected from of a group consisting of nitrates, sulfates, carbonates, phosphates, acetates of these metal elements in the highest valence state and intermediate valence state or double salts thereof; or one or more selected from a group consisting of cyclodextrins, crown ethers, acetylacetones, nitrogen-containing crown ethers and nitrogen-containing heterocyclic rings, EDTA, DMF, and DMSO complexes of these metal elements in the highest valence state and intermediate valence state; or selected from a group consisting of hydroxides of these metal elements in the highest valence state and intermediate valence state; or selected from a group consisting of oxides of these metal elements in the highest valence state and intermediate valence state which have a perovskite structure, including but not limited to compounds of $Ce_xTi_{(1-x)}O_2$ (x=0.25~0.4), $Ca_{0.6}La_{0.27}TiO_3$, $La_{(1-y)}Ce_yMnO_3$ (y=0.1~0.4) and $La_{0.7}Ce_{0.15}Ca_{0.15}MnO_3$.

10. The composite material according to claim 8, wherein said high-valence metal compound is added in an amount of 0.0001~5 wt %, of the resin.

11. The composite material according to claim 8, wherein said high-valence metal compound is added in an amount of 0.001~1 wt % of the resin.

12. An ion exchange membrane made from said composite material according to claim 1 and a fuel cell comprising said ion exchange membrane.

* * * * *

UNITED STATES PATENT AND TRADEMARK OFFICE
CERTIFICATE OF CORRECTION

| | |
|---|---|
| PATENT NO. | : 8,927,612 B2 |
| APPLICATION NO. | : 13/805325 |
| DATED | : January 6, 2015 |
| INVENTOR(S) | : Yongming Zhang et al. |

It is certified that error appears in the above-identified patent and that said Letters Patent is hereby corrected as shown below:

In the Claims

Col. 30, line 4, Claim 9

Delete "from of a group",

Insert --from a group--

Signed and Sealed this
Ninth Day of August, 2016

Michelle K. Lee
*Director of the United States Patent and Trademark Office*